United States Patent

Nonoyama

[11] 4,002,283
[45] Jan. 11, 1977

[54] METHOD FOR REINFORCING A LOAD-BEARING SURFACE

[76] Inventor: Tikahiro Nonoyama, 3984-148, Aza-Iwagane, Aichi, Japan

[22] Filed: May 6, 1975

[21] Appl. No.: 575,115

[30] Foreign Application Priority Data

June 25, 1974 Japan .............................. 49-72581

[52] U.S. Cl. .............................................. 228/112
[51] Int. Cl.$^2$ ........................................ B23K 21/00
[58] Field of Search ............... 228/2, 112, 113, 114

[56] References Cited

UNITED STATES PATENTS 3,699,639  10/1972  Ditto et al. ......................... 228/112

Primary Examiner—Al Lawrence Smith
Assistant Examiner—Margaret Joyce
Attorney, Agent, or Firm—William Anthony Drucker

[57] ABSTRACT

One of a member to be reinforced and a reinforcing material is rotated relative to the other and both are made to contact with each other. Under a considerably high initial pressure, the penetration of the reinforcing material into the member to be reinforced is effectuated and under a reduced pressure, frictional welding is done at the contacting portions of the member to be reinforced and the reinforcing material. As the result of the stop of the relative rotation, the welded portion is cooled to be coagulated and the unification of the member and the material results. Before the stop of the relative rotation, the pressure may be raised again.

3 Claims, 6 Drawing Figures

METHOD FOR REINFORCING A LOAD-BEARING SURFACE

BACKGROUND OF THE INVENTION

This invention relates to a method in which members moving repeatedly or those receiving them used in machinary are reinforced with some hard material. According to the conventional method of this kind for reinforcing, members to be reinforced and the reinforcing hard material are not unified materially but are connected mechanically by such means as screwing, caulking and riveting. Thus, the attached hard materials becomes loose while the reinforced member is subject to repeated impacts. Further, because the reinforcing hard material requires a size necessary not only for reinforcement but also for being attached, it has to be of a size unnecessarily large for reinforcement and it is difficult to reinforce small portions or workpieces very locally. The reinforcing work with mechanical attachment of hard material takes long time and is troublesome because of preliminary steps such as machining and boring. When the member to be reinforced is a mechanically weak one such as laminated silicon steel plates used as a plunger in an electromagnet, the reinforcement by mechanical attachment of hard material is limited in its reinforcing effect and in its range of application.

Then, the object of the present invention lies in providing a reinforcing method making use of friction welding in which reinforcement can be applicable very locally and reinforcing work is simple and efficient.

SUMMARY OF THE INVENTION

One of a hard material as a reinforcing member and a member to be reinforced is rotated and set in face of the other which is not rotated. Both are made to approach to each other and a pressure is applied between them in such a degree that the hard material can enter the member to be reinforced, shaving the same. Then, the initial pressure is reduced so long as the melting of the contacting portions of them due to frictional heat is possible. As the result of melting, the material unification of them is accomplished after they have been cooled on account of the interruption of the relative rotation between them. If the pressure is raised again after the initial pressure has been lowered within a limit suitable for melting, the melted portions can be bulged out around and the unification becomes more complete.

The salient relationships have been described. It will be understood that the reinforcing method of the present invention making use of friction welding make possible an excellent reinforcing effect resulting from the ideal unification of a reinforcing material and a member to be reinforced and an arbitrary and local reinforcement being done by simple and neat workings.

In the drawings

Figure 1:
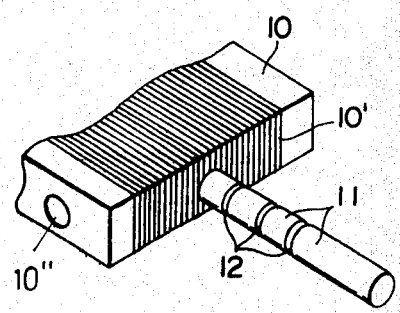
FIG. 1 is a perspective view showing a hard material and a member to be reinforced while working.
Figure 2:
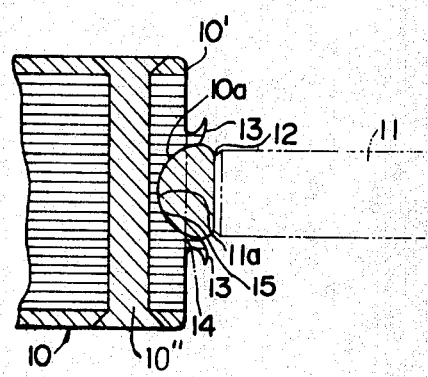
FIG. 2 is a view in section of the hard material and the member to be reinforced which has been welded.

Referring to the drawings, embodiments of the present invention are described. Reference numeral 10 indicates a plunger of an electromagnet taken as an example of a member to be reinforced (the plunger having been riveted by rivet 10''). This plunger has a function to urge a push-pin (spule) when it is used, for example, in an electromagnetic valve and its main material is laminated silicon steel plates. Numeral 10' shows an end surface of it and is an object to be reinforced according to the present invention. Numeral 11 indicates a hard rod used as a reinforcing hard material. This rod member is preferably harder than the member to be reinforced 10. S.K.D.11, S.K.3, S.K.S.3, and materials equivalent to these are used usually as the material of this rod member. This hard rod is provided with circular slits 12 on its cylindrical surface at its every unit and units of the hard rod are adapted to be broken at these slits and to be separated from one another.

Figure 3:
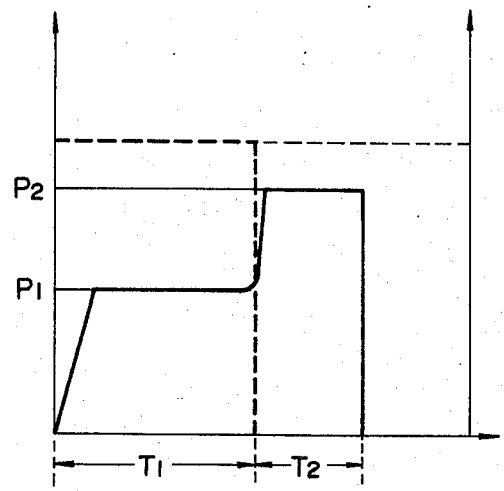
FIG. 3 is a view showing a graph of welding pressure as a function of time.
Figure 4:
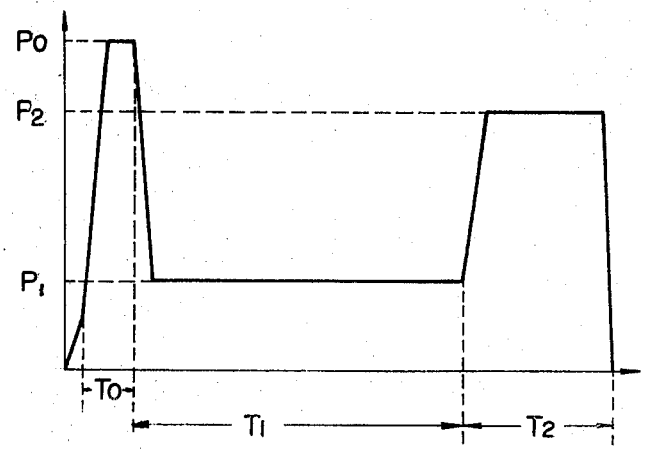
FIG. 4 is a view similar to FIG. 3 but associated with another working stroke.
Figure 5:
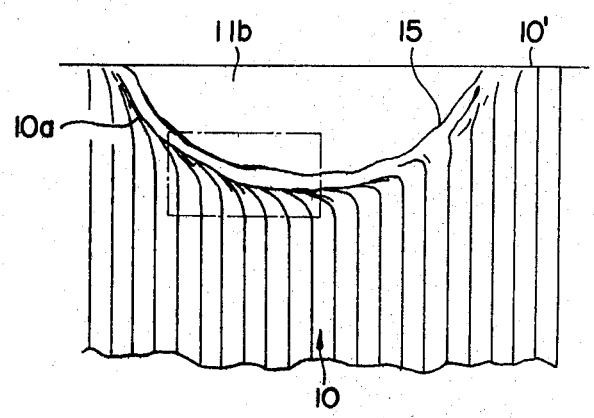
FIG. 5 is a view in section of the reinforced member taken slightly off the center of the welded portion.
Figure 6:
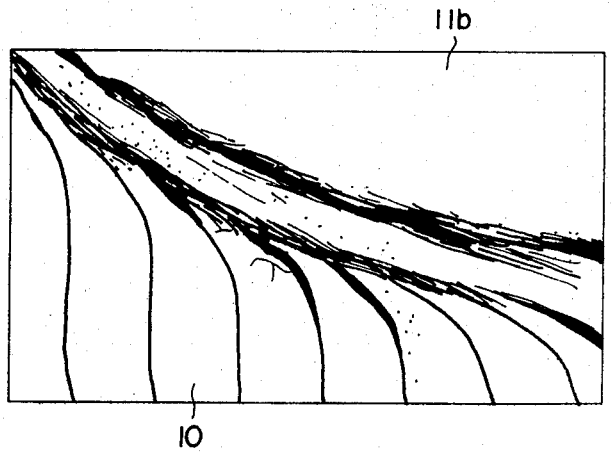
FIG. 6 is an enlarged fragmental view of a portion surrounded by chain-dotted line in FIG. 5.

Next, a reinforcing method is described on the base of the graph shown in FIG. 4. First, a rotary chuck adapted to holder the plunger 10 and a holder adapted to hold the hard rod 11 are prepared and they are set so that the situation as shown in FIG. 1 may be established. (This rotary chuck is rotatable as is in machine tools and is constructed to be reciprocated by a oil pressure feed mechanism or other well known feed mechanism. Next, the plunger 10 is advanced towards the hard rod 11 while the rotary chuck is rotated at a high speed (for example of 3000–4000 r.p.m.). The end surface 10' of the plunger 10 is brought into contact with the hard rod 11 and is advanced by the feed mechanism in a time interval To (for example 0.7 seconds) under such a sufficiently high pressure shown by Po in FIG. 4 that the hard rod 11 can go into the plunger 10 shaving the same (for example under a pressure of $25kg/mm^2$) and thus the hard rod 11 penetrates into the plunger 10. Then, the pressure is reduced to such a value shown by P1 which is sufficient to heat and melt the contacting portions 10a and 11a with the heat generated at the contacting portions as the result of friction between the plunger 10 and the hard rod 11 (for example to a pressure of $6kg/mm^2$), the pressure-reduced situation is maintained for a suitable time interval shown by T1 (for example 5.5 seconds) and both contacting portions 10a and 11a are melted. After melting of these portions, the relative rotation of them is stopped and they are pressed to each other under a pressure shown by P2 which is sufficient to make the hard rod 11 push out the melted material around and to force the hard rod 11 into the plunger (for example to a pressure of $17.5kg/mm^2$) and this situation is maintained for a time interval shown by T2, the plunger 10 and the hard rod 11 adhering to each other. The stop of the relative rotation may take place at a suitable instance before the adhesion of the melted portions. The plunger having been welded for reinforcement is taken off from the rotary chuck and the hard rod 11 is broken at the slit 12 nearest to the plunger 10. The rest of the broken hard rod piece and a projection 13 formed as the result of the coagulation of the melted material pushed out are shaved off at a chain-dotted line 14 to be removed and necessary treatments such as hardening treatment, polishing, rust-preventing treatment and so on are carried out on the shaved off surface. The cross-section of the reinforced portion 11b of the plunger 10 thus obtained shows that the material of the hard rod 11 is stuffed in the material of the plunger 10 and both materials form a neat spherical boundary surface 15 without letting blowholes or air gaps between them, which proves the good unification of both materials. If the time interval T2 is chosen properly, it is possible to apply such hardening treatment on the portion of the hard rod embedded in the plunger 10 as quenching without disturbing the constitution and the directional property of the embedded portion. It will be understood easily that even if the rotary chuck and the holder as a securing vice are used interchangedly, i.e., even if the plunger 10 is clumped by the securing vice and the hard rod 11 is rotated and advanced to contact welding, the same result as in the embodiment just described is obtained. The pressures P0, P1, and P2 and time intervals T0, T1, and T2 are chosen according to the kinds of the member to be reinforced 10 and the hard rod 11, the thickness of the hard rod 11 and the length of the hard rod 11 to be embeded. The reinforcing work may be carried out under various different conditions and, for example, under a condition shown in FIG. 3.

As is seen from the above description, according to the present invention, the systematic unification of a reinforcing material and a member to be reinforced is possible, the embedded depth of the reinforcing material can be very large to prevent such troubles as the break of the reinforcing material and thus, it is possible to construct a load-bearing or impact-receiving surface which is durable for uses in the long term. The present invention has an advantage on the light of saving materials in that the reinforcement can be applied on an arbitrary portion of a member to be reinforced very locally and the necessary quantity of the hard rod 11 can be limited approximately to that corresponding to the embedded portion of the hard rod. It has been shown experimentally that a solenoid valve having a plunger reinforced according to the present invention offers a less iron loss and a less residual attractive force than in a conventional solenoid valve.

The description of the present invention has been done with some preferred embodiments but it should be understood that many modifications and changes are possible without departing from the spirits of the present invention and the scope of appended claims.

We claim:

1. A method for reinforcing a load-bearing surface of a laminated plunger in a solenoid, including a step to rotate one of said laminated plunger and a reinforcing material relative to the other, a step to contact the reinforcing material with the load-bearing surface formed by the side edges of the laminated silicon steel plates of said plunger, a step to apply an initial pressure, sufficient to make the reinforcing material penetrate into said laminated plunger, between said reinforcing material and said plunger, a step to reduce said initial pressure so long as the melting of both said reinforcing material and said laminated plunger is possible, a step to weld frictionally the contacting surfaces of said reinforcing material and said laminated plunger with the frictional heat generated in the contacting portions of said reinforcing material and said laminated plunger, and a step to stop the relative rotation to cool and coagulate the welded portion.

2. A method for reinforcing a load-bearing surface according to claim 1 in which the pressure is raised again after its reduction to push out the melted material around.

3. A method for reinforcing a load-bearing surface according to claim 1 in which said reinforcing material has a form of a rod provided with slits for easily taking off a unit piece of the rod necessary for one reinforcement.

* * * * *